UNITED STATES PATENT OFFICE.

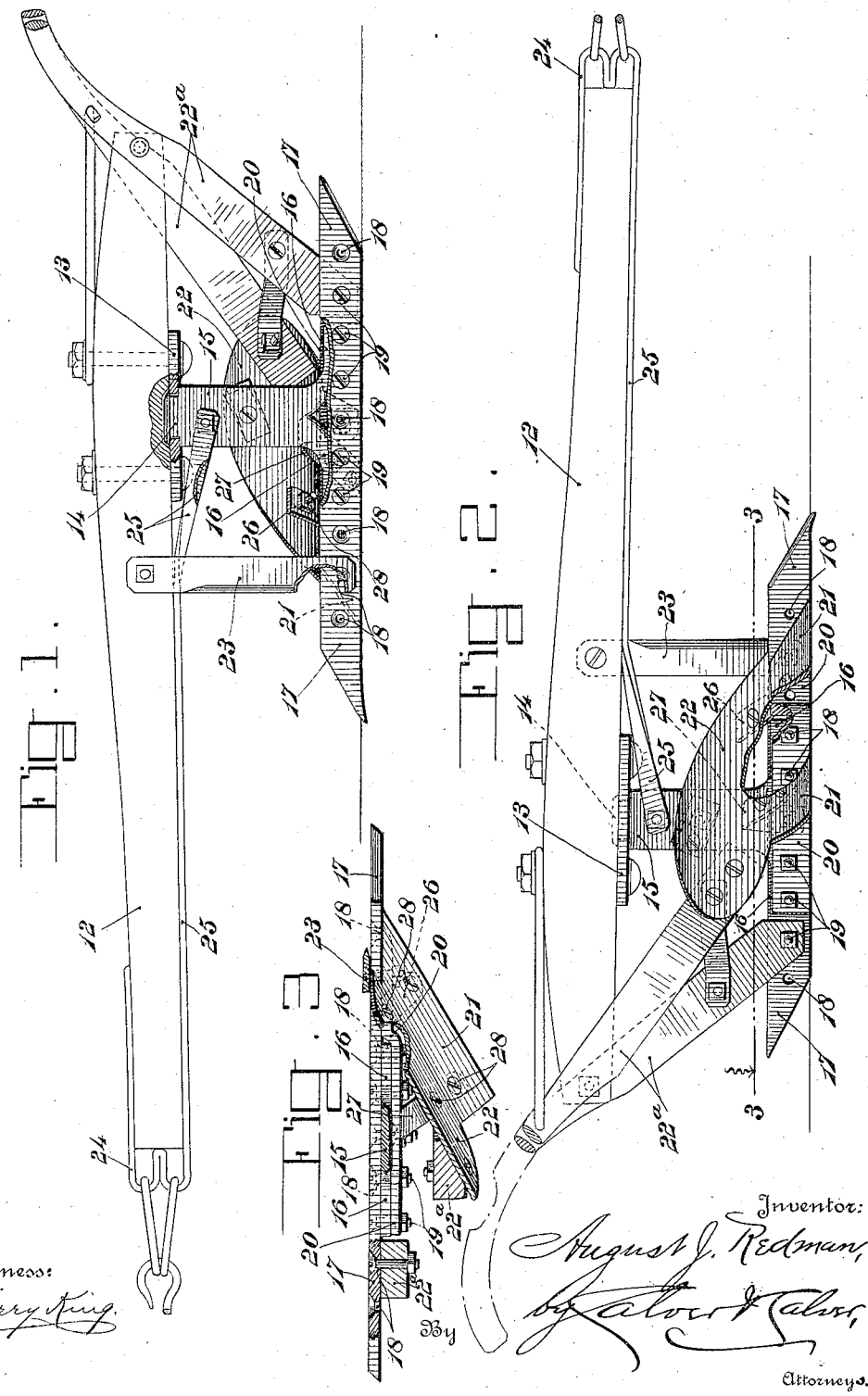

AUGUST J. REDMAN, OF FALL CITY, WASHINGTON.

PLOW.

1,178,600.  Specification of Letters Patent.  Patented Apr. 11, 1916.

Application filed August 23, 1915. Serial No. 46,934.

*To all whom it may concern:*

Be it known that I, AUGUST J. REDMAN, a citizen of the United States, residing at Fall City, in the county of King and State of Washington, have invented or discovered certain new and useful Improvements in Plows, of which the following is a specification, reference being had therein to the accompanying drawings.

This invention relates to plows, and more particularly to an adjustable and reversible plow point, together with means for mounting the same in such a manner that the plow point will be horizontal and will serve as the landslide of the plow, as will hereinafter more fully appear.

In the accompanying drawings Figures 1 and 2 are opposite side views of a plow embodying the present invention, and Fig. 3 is a horizontal section on line 3—3, Fig. 2.

Referring to the drawings, 12 denotes the plow beam to which is bolted a plate 13 having a mortise to receive a tenon 14 at the upper end of a standard 15 terminating at its lower end in the horizontally extending arms 16. The plow point consists of a horizontal bar 17 reversely pointed at its opposite ends so that it may be reversed, end for end, if desired.

The plow point bar 17 is provided with a series of equally spaced holes 18 so as to adapt it to be attached, by bolts 19, to the horizontal arms 16 at the bottom of the standard 15, this attachment being preferably effected by the assistance of a bracing and clamping bar 20 also provided with a series of equally spaced holes for the passage of the said bolts 19. The arms 16 are also provided with equally spaced holes for the passage of said bolts, as will be understood from Fig. 3. The clamping bar 20 may be rigidly attached to or be formed integral with the plow-share 21 which, in the construction herein shown, is formed separate from the mold-board 22, although said plow-share and mold board may be formed integral, if desired, as is a usual construction.

By virtue of the equally spaced holes in the plow point 17 and the other parts to which it is attached, it will be understood that the said plow point bar is adapted to be so adjusted as to make the plow point extend more or less forward from the plow-share and mold-board, so as to adapt the plow for use in different kinds of material. Thus in very hard materials it will be preferred to adjust the plow point farther forward from the plow-share and mold-board, so as to loosen the material, while in use in plowing softer material the adjustment of the plow point may be such that it will not extend so far forward of the plow-share and mold-board. The plow handles 22ª may be attached to the plow in any suitable manner, although in the construction herein illustrated one of the said handles is shown as being bolted to the mold-board while the other is bolted to the plow point bar and plow beam.

The forward end of the plow point bar is preferably steadied or braced from the plow beam by means of a vertical bracing bar 23 the forward edge of which is sharpened so as to adapt it to serve as a colter.

The plow clevis 24, at the forward end of the plow beam, is preferably formed integral with a bar 25 extending rearward from the clevis and forked at its rear end so as to adapt it to be bolted to both sides of the standard 15.

In forming the plow-share and mold-board in separate parts, as in the construction shown, these parts will preferably be secured together by means of straps 26 and 27 attached to these parts by means of bolts 28, the strap 27 being continued to form a brace connecting the plow-share and mold-board with the clamping bar 20.

From the foregoing it will be understood that the invention provides an adjustable and reversible plow point bar which is disposed horizontally so that it will not have an abnormal tendency to thrust the plow deeper into the material when in use, the said plow point bar being so disposed that it forms the bottom or sole of the landside of the plow.

The improved plow is more especially intended for construction use in engineering operations, and has proved very efficient in such use, in that it is well adapted to work in different kinds of material with a forward adjustment of the plow point, as hereinbefore indicated, according to the character of the material being worked.

I do not wish to be understood as claiming broadly an adjustable and reversible plow point, but so far as I am aware I am the first to provide a plow with a horizontally disposed, adjustable and reversible plow point, or with an adjustable plow point which is mounted as to serve as the bottom portion of the landside of the plow. This is an important feature of my improved plow, and the details of construction of the other parts of the plow may be varied widely, within the limits of mechanical skill, without departing from the essence of the invention.

Having thus described my invention I claim and desire to secure by Letters Patent:

1. A plow provided with a horizontally-disposed longitudinally adjustable and reversible plow point bar arranged at the bottom of the plow so as to serve as the bottom of the landside thereof.

2. A plow provided with a horizontally-disposed, longitudinally adjustable and reversible plow point bar, combined with a plow beam and a vertical support attached to said plow beam and having at its lower end horizontal arms to which said plow point is adjustably secured, so as to be adapted to serve as the lower part of the landside of the plow, and also so that the said point may be made to extend more or less forward of the mold-board to adapt the plow for use in different kinds of soils or materials.

3. In a plow, the combination with a plow beam, of a standard attached to and depending from said plow beam and provided at its lower end with horizontal arms having equally spaced holes, a double-pointed, longitudinally adjustable and reversible plow point bar horizontally disposed at the bottom of the plow so as to serve as the bottom of the landside thereof, said plow point bar also having a series of equally spaced holes to adapt said bar to be reversed or be adjusted forward or rearward relative to said standard, and attaching bolts passing through said holes.

4. In a plow, the combination with a plow beam, of a standard attached to and depending from said plow beam and provided at its lower end with horizontal arms having equally spaced holes, a double-pointed, reversible plow point bar also having a series of equally spaced holes to adapt said bar to be reversed or be adjusted forward or rearward relative to said standard, a clamping bar also having a series of equally spaced holes and between which clamping bar and said plow point said arms are disposed, and attaching bolts passing through said holes.

5. In a plow, the combination with a plow beam, of a standard depending from said plow beam and provided at its lower end with horizontal arms, a double-pointed, reversible plow point bar having a series of equally spaced holes to adapt said bar to be reversed or to be adjusted forward or rearward relative to said standard, said plow point bar being arranged at the bottom of the plow so as to serve as the bottom of the landside thereof, a clamping bar coöperating with said standard and said plow point bar and also having a series of equally spaced holes, and securing bolts passing through said clamping and plow point bars and the said arms of said standard.

In testimony whereof I affix my signature, in presence of two witnesses.

AUGUST J. REDMAN.

Witnesses:
J. W. SWEENEY,
F. G. MCWILLIAMS.

Copies of this patent may be obtained for five cents each, by addressing the "Commissioner of Patents, Washington, D. C."